(12) United States Patent
Pacheco-Tougas et al.

(10) Patent No.: US 6,978,618 B2
(45) Date of Patent: *Dec. 27, 2005

(54) BULKHEAD PANEL FOR USE IN A COMBUSTION CHAMBER OF A GAS TURBINE ENGINE

(75) Inventors: Monica Pacheco-Tougas, Manchester, CT (US); Francis K. Costigan, West Hartford, CT (US); Matthew D. Stoner, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/770,703

(22) Filed: Feb. 2, 2004

(65) Prior Publication Data

US 2005/0138931 A1   Jun. 30, 2005

Related U.S. Application Data

(63) Continuation of application No. 10/147,266, filed on May 14, 2002, now Pat. No. 6,751,961.

(51) Int. Cl.[7] ................................................ F23R 3/04
(52) U.S. Cl. ............................ 60/752; 60/754; 60/756
(58) Field of Search .......................... 60/752, 754, 756, 60/755, 757, 748, 804

(56) References Cited

U.S. PATENT DOCUMENTS

| | | | |
|---|---|---|---|
| 4,085,581 A | * | 4/1978 | Caruel et al. ................. 60/738 |
| 4,241,586 A | * | 12/1980 | Caruel et al. ................. 60/738 |
| 5,129,231 A | | 7/1992 | Becker et al. |
| 5,253,471 A | * | 10/1993 | Richardson ................... 60/804 |
| 5,271,219 A | * | 12/1993 | Richardson ................... 60/804 |
| 5,396,759 A | | 3/1995 | Richardson |
| 5,509,270 A | * | 4/1996 | Pearce et al. ................. 60/740 |
| 5,894,732 A | * | 4/1999 | Kwan .......................... 60/756 |
| 5,918,467 A | | 7/1999 | Kwan |
| 5,941,076 A | * | 8/1999 | Sandelis ....................... 60/752 |
| 5,956,955 A | * | 9/1999 | Schmid ........................ 60/748 |
| 6,497,105 B1 | * | 12/2002 | Stastny ........................ 60/796 |
| 6,751,961 B2 | * | 6/2004 | Pacheco-Tougas et al. ... 60/752 |

FOREIGN PATENT DOCUMENTS

| GB | GB 2 107 448 | 4/1983 |
|---|---|---|
| GB | GB 2 361 304 | 10/2001 |

* cited by examiner

*Primary Examiner*—Ted Kim
(74) *Attorney, Agent, or Firm*—Bachman & LaPointe, P.C

(57) ABSTRACT

The invention relates to a bulkhead panel for use in a combustion chamber of a gas turbine engine. The bulkhead panel comprises a first side and a second side, a plurality of panel holes extending from the first side to the second side through which cooling air flows, and a circumferential inner rail on said first side dividing said first side into a first cavity region having a plurality of the panel holes and a second cavity region having a plurality of the panel holes. Each of the panel holes has an exit nozzle which is angled so as to create a swirling flow of cooling air over the second side of the panel.

28 Claims, 4 Drawing Sheets

BULKHEAD PANEL FOR USE IN A COMBUSTION CHAMBER OF A GAS TURBINE ENGINE

CROSS REFERENCE TO RELATED APPLICATION

This application is a continuation of U.S. patent application Ser. No. 10/147,266, entitled BULKHEAD PANEL FOR USE IN A COMBUSTION CHAMBER OF A GAS TURBINE ENGINE, filed May 14, 2002, By Monica Pacheco-Tougas et al., now U.S. Pat. No. 6,751,961.

BACKGROUND OF THE INVENTION

This invention relates to combustors for gas turbine engines and in particular to an improved bulkhead panel for use in the combustors.

Gas turbine engines, such as those used to power modern commercial aircraft, include a compressor for pressurizing a supply of air, a combustor for burning a hydrocarbon fuel in the presence of the pressurized air, and a turbine for extracting energy from the resultant combustion gases. The combustor typically comprises radially spaced apart inner and outer liners or support shells. The liners or support shells define an annular combustion chamber that resides axially between the compressor and the turbine. Arrays of circumferentially distributed combustion air holes penetrate each liner or support shell at multiple axial locations to admit combustion air into the combustion chamber. A plurality of circumferentially distributed fuel injectors project into the forward end of the combustion chamber to supply the fuel.

At one end of the combustor is a bulkhead panel which is subjected to relatively high temperatures. As a result, it is necessary to provide the bulkhead panel with effective cooling.

SUMMARY OF THE INVENTION

Accordingly, it is an object of the present invention to provide an improved bulkhead panel for use in a gas turbine engine combustor.

It is a further object of the present invention to provide a bulkhead panel which has an effective cooling scheme associated therewith.

The foregoing objects are attained by the bulkhead panel of the present invention.

In accordance with the present invention, a bulkhead panel for use in a gas turbine engine combustor broadly comprises a first side and a second side, a plurality of panel holes extending from the first side to the second side through which cooling air flows, and a circumferential inner rail on the first side for dividing the first side into a first cavity region having a plurality of the panel holes and a second cavity region having a plurality of the panel holes. In a preferred embodiment, each of the panel holes has an exit nozzle on the second side, which exit nozzle is angled so as to create a swirling flow of cooling air over the second side of the panel.

Other details of the bulkhead panel for use in a gas turbine engine combustor of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
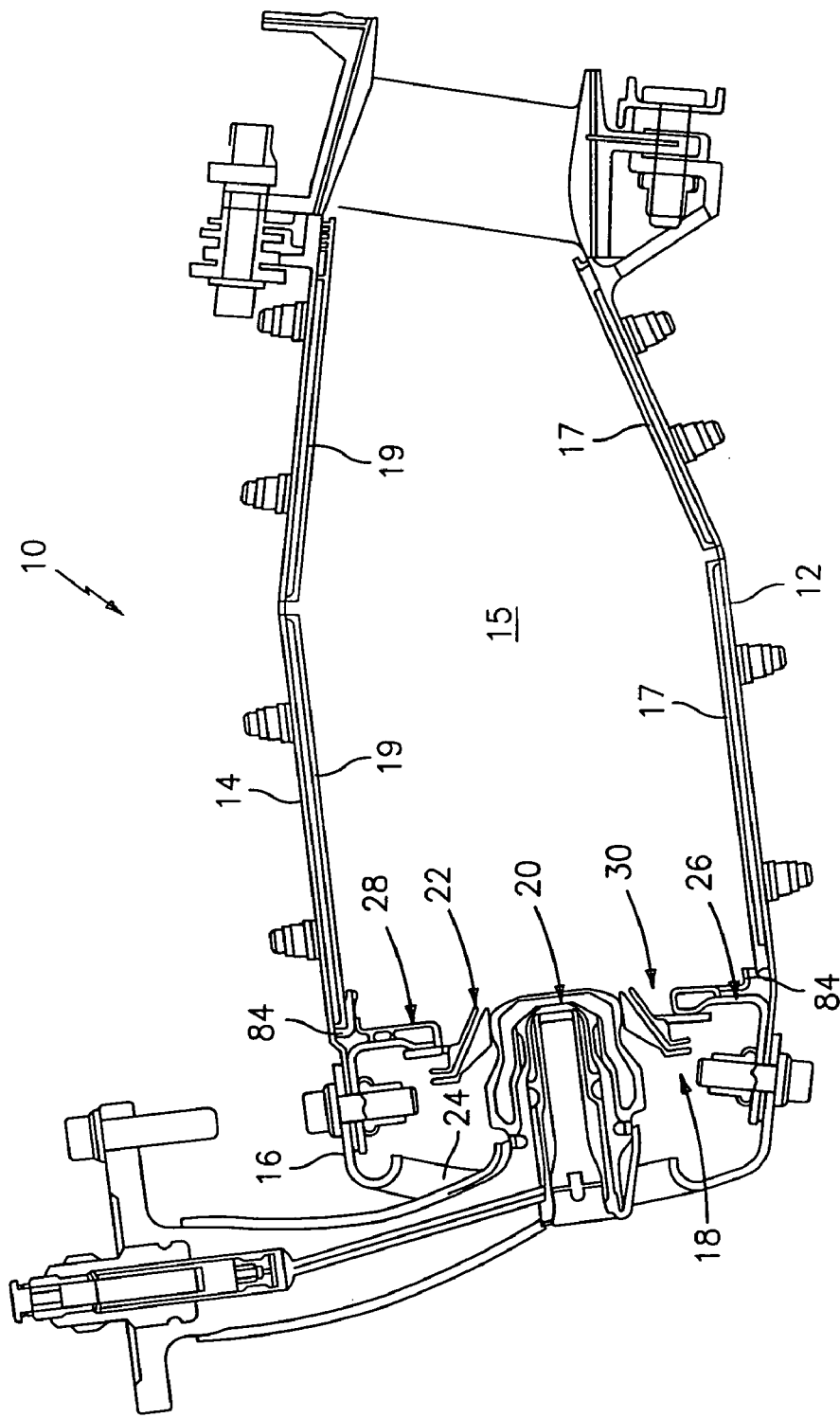
FIG. 1 is a cross sectional view of a combustor used in a gas turbine engine.

Referring now to the drawings, FIG. 1 illustrates a combustor 10 for use in a gas turbine engine. The combustor 10 is formed by radially spaced inner and outer support shells 12 and 14. The support shells 12 and 14 define an annular combustion chamber 15. Impingement cooling holes (not shown) penetrate through the support shells 12 and 14. Inner and outer heat shield panels 17 and 19 line the hot (inner side) of the inner and outer support shells 12 and 14. As can be seen in FIG. 1, each support shell 12 and 14 typically has two rows of heat shield panels 17 and 19 respectively, namely a forward row and an aft row.

The combustor 10 also includes a front end assembly comprising an annularly extending hood 16, a bulkhead assembly 18, fuel injectors 20, and fuel injector guides 22. The front end assembly is the vehicle for introducing primary combustion air into the forward end of the combustion chamber 15.

The hood 16 extends radially between and is secured to the forwardmost ends of the inner and outer support shells 12 and 14. The hood 16 includes circumferentially distributed hood ports 24 that accommodate the fuel injectors 20 and introduce air into the forward end of the combustion chamber 15.

The bulkhead assembly 18 includes an annularly extending bulkhead support shell 26 secured to the inner and outer support shells 12 and 14 and a plurality of circumferentially distributed bulkhead heat shield panels 28 secured to the bulkhead support shell 26. The bulkhead support shell 26 includes circumferentially distributed openings 30 to accommodate the fuel injectors 20 and fuel injector guides 22. The bulkhead support shell 26 is preferably coined. This is because there is a small step or depression that is created close to every opening through which the fuel injection nozzle and the fuel injector guides 22 are inserted. The fuel injection nozzle guide 22 sits on and has full contact with this depression. The support shell 26 is provided with a plurality of holes 73 which supply impingement air to the back or cold side 34 of the bulkhead panel 28 right at the depression location. Because of the angled surface of the depression itself, the holes 73 are not perpendicular to the back surface 65 of the bulkhead panel 28.

Figure 5:
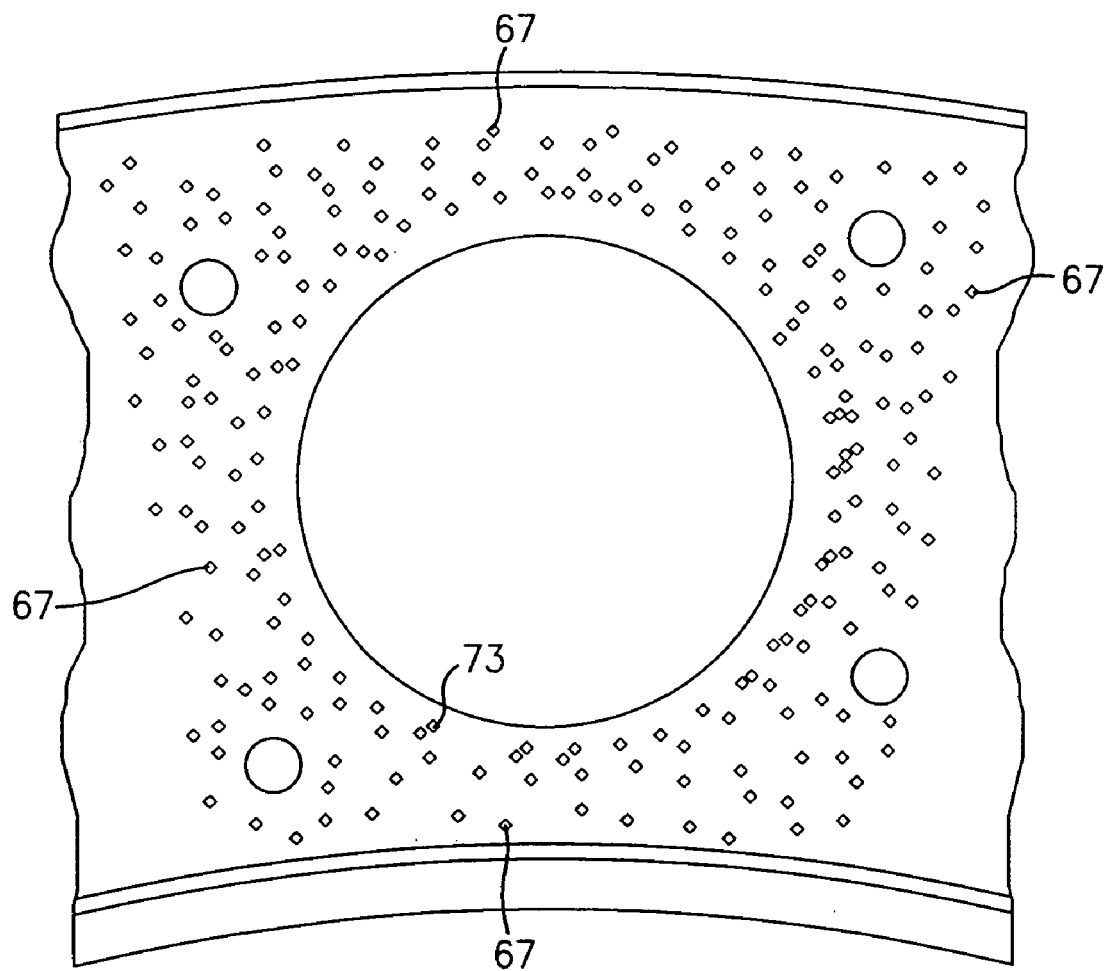
FIG. 5 illustrates a portion of a bulkhead shell used in the combustor of FIG. 1.

As can be seen from FIG. 5, cooling air passages or holes 67 perforate other portions of the bulkhead support shell 26. The holes 67 are perpendicular to the surface of the support shell 26. The holes 67, as well as the holes 73, allow jets of cooling air to impinge on the back surface 65 of the bulkhead panel 28. The jets of air then flow through the holes 60 and 62 in the panel 28. The heat transferred out of the panel 28 in this manner is very large in the region where the jets impinge (stagnation point) and it decays as the cooling air flows over the surface of the cold side 34 of the panel 28 until it goes into a panel hole 60 or 62. The impingement holes 73 and 67 in the support shell 26 direct air so that it impinges on the panel 28 between adjacent ones of and in between adjacent holes 60 and 62.

The fuel injector guides 22 each have a central opening circumferentially aligned with one of the hood ports (not shown). The fuel injector guides 22 each project through the bulkhead assembly. Purge air passages (not shown) and swirl air passages (not shown) extend through each of the fuel injector guides 22. A guide air swirler (not shown) resides in the upstream end of each swirl air passage.

Figure 2:
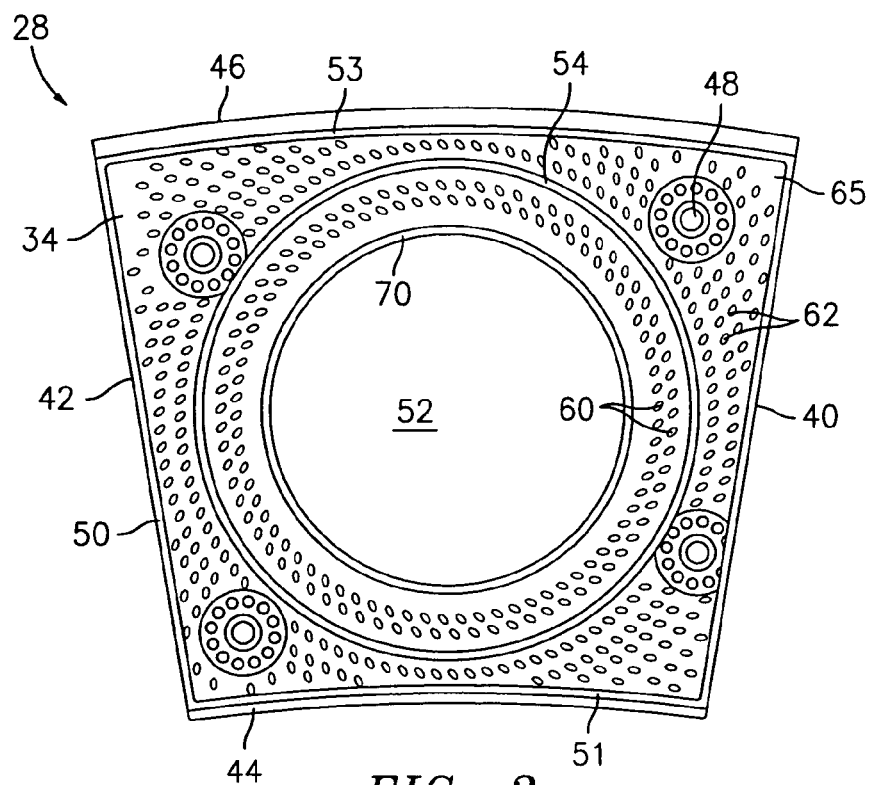
FIG. 2 is a rear view of a bulkhead panel in accordance with the present invention.
Figure 3:
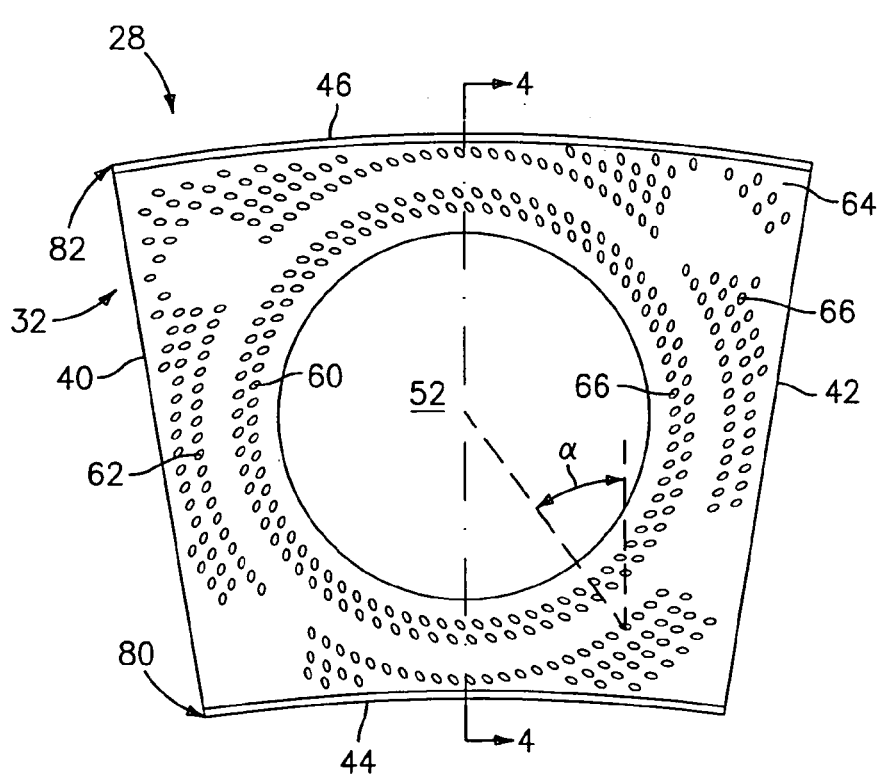
FIG. 3 is a front view of a bulkhead panel in accordance with the present invention.
Figure 4:
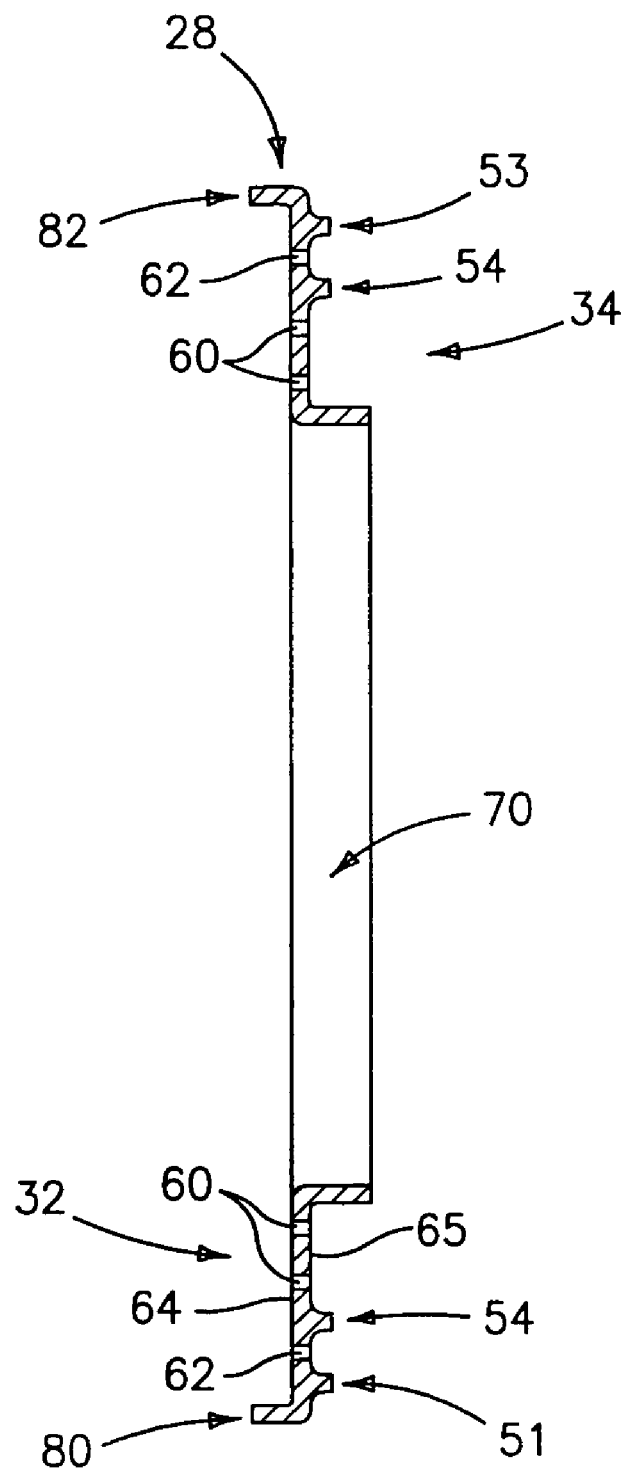
FIG. 4 is a sectional view of a bulkhead panel in accordance with the present invention taken along line 4—4 in FIG. 3.

Referring now to FIGS. 2–4, each bulkhead panel 28 preferably subtends a desired arc. The extent of the arc depends upon the number of panels 28 affixed to the bulkhead support shell 26. For example, a panel 28 would have an arc about 20 degrees for an eighteen panel configuration. Each panel 28 has a front or hot side 32 and the cold or back side 34. Each panel 28 further has two radially extending, linear sides edges 40 and 42 and curved inner and outer borders 44 and 46. As shown in FIG. 2, located on the back or cold side 34 of the panel 28, close to each of the panel corners, there are four attachment posts 48 for securing the panel 28 to the bulkhead support shell 26.

Each panel 28 includes an integrally formed peripheral rail 50 that extends radially and contacts the support shell 26 when the panel 28 is affixed thereto. Each panel 28 further includes a center opening 52 through which a fuel injector 20 and a fuel injector guide 22 project. Each panel 28 also includes an integrally formed inner circumferential rail or rib 54 on the back or cold side 34 located radially outwardly of and spaced from the center opening 52. The inner circumferential rail 54 preferably is of the same height as the integrally formed peripheral rails 50, 51, and 53. The inner circumferential rail 54 provides needed structural support for the panel 28 and divides the back or cold side 34 into two distinct pressurized cavity regions 56 and 58 through which cooling air is injected. As will be explained more fully hereinafter, the cavity region 56 has an array of the panel holes 60 and the cavity region 58 has an array of the panel holes 62. The panel holes 60 and 62 are used to create a film of cooling air over the front or hot side 32 of the panel 28.

The main advantage of having separate cooling regions 56 and 58 in this manner is the maintenance of an optimum air distribution through each panel 28 created by the inner circumferential rail 54 and the peripheral rails 50, 51, and 53. The inner circumferential rail and the peripheral rails 50, 51, and 53 and the panel 28 cause the cavity region 58 to be a sealed chamber when the rails 50, 51, 53, and 54 are placed in contact with the bulkhead support shell 26. As a result, a pressure drop is created which drives cooling air into every panel hole 60 and 62 of the panel 28 in such a way that the panel 28 is optimally cooled by convection through the panel holes 60 and 62 and the creation of an even film flow through the panel holes 60 and 62.

The panel holes 60 and 62 in the regions 56 and 58 pass through the interior of the panel 28 at an angle to the surfaces 64 and 65 of the sides 32 and 34 respectively. A shallow angle is preferred because it reduces the penetration of the cooling jets into the combustion chamber, assuring a better film coverage or attachment to the hot surface. As can be seen from FIGS. 2 and 3, the panel holes 60 and 62 are arranged in circumferential rows around the opening 52 with a low radial spacing between adjacent rows.

The outlet or exit nozzle 66 of each hole 60 and 62 on the front or hot side 32 of the panel 28 is angled inwardly. The angle α of each exit nozzle is known as the compound angle. The compound angle α of each of the panel holes 60 and 62 has an axial component which is the angle to the surface of the panel 28 and a radial component which is within the range of from a pure tangential angle to a pure radial angle. If desired, radially inner holes in each array of holes 60 and 62 can have a slightly different angle than the outer holes in each array.

Swirler vanes in the fuel injector 20 and in the fuel injector guide 22 cause air exiting these elements to flow in a swirling pattern around the center of the bulkhead panel 28. The compound angle α for each panel hole 60 and 62 is designed to cause air exiting the panel holes 60 and 62 to rotate in the same direction as, preferably a clockwise direction, and to align the cooling air film exiting the panel holes 60 and 62 with, the swirling combustion gas. In general, the selection of an optimal compound angle within the aforementioned range and the circumferential row arrangement results in a most effective cooling array. It is believed that the circumferential row arrangement and the compound angle α are both instrumental in achieving an adequate film coverage and improved cooling effectiveness. The cooling air film flowing over the hot surface 32 of the panel 28 is replenished at every row as it continues to flow circumferentially and slightly inward without facing the shearing force of the external combustion gases.

The bulkhead panel 28 has an integrally formed central lip 70 which forms the center opening 52. The lip 70 is longer than the peripheral rails 51 and 53 and the inner circumferential rail 54 and sits on the fuel injector guide 22. The lip 70 seals the inner cavity region 56 and forms a sealed chamber that is created by the bulkhead support shell 26, the bulkhead panel 28, and the inner circumferential rail 54. Sealing of the cavity region 56 in this manner is of utmost importance and is needed to force cooling air to vent through the panel holes 60 and 62. Venting of the cooling air through the panel holes 60 and 62 has two main purposes. First, the air film which is created extracts heat from the panel 28 by convection as it moves through the panel holes 60 and 62. Second, as the cooling air exits the panel holes 60 and 62, it forms a film layer on the surface 64 of the front or hot side 32 of the panel 28, which surface is a substantially planar surface. This film helps protect the panel 28 from hot combustion gases and further extracts heat from the panel 28.

As can be seen from FIGS. 3 and 4, the panel 28 has two axially extending, integrally formed lips 80 and 82 on the inner and outer edges that define the arc of the panel 28. The purpose of the lips 80 and 82 is to help channel cooling air that exits the cavity 84 formed by the support shells 12 and 14 and the forward row of liner segments 17 and 19. This air, which has already extracted heat from the forward liner segments 17 and 19, is further utilized as a film for the upstream region of the same liner segments 17 and 19. Without the lips 80 and 82, the cooling air would diffuse into the front end of the combustion chamber 15, become involved in the combustion process, and increase the generation of pollutants.

As can be seen from the foregoing description, a panel 28 for a bulkhead assembly is provided which has a construction which creates an effective cooling air film layer which helps protect the hot side of the bulkhead assembly and adds to the overall life of the combustor 10. Further, a panel 28 is provided which may be easily replaced as needed.

The panel 28 may be formed using any suitable technique known in the art. For example, the panel 28 may be a cast structure with the panel holes 60 and 62 being machined into the panel subsequent to the forming of the cast panel.

Alternatively, the panel 28 may be machined from an appropriate stock of material.

The panel 28 may be formed from any suitable metallic or non-metallic material or composite known in the art, such as a cast nickel alloy.

It is apparent that there has been provided in accordance with the present invention a bulkhead panel for use in a combustion chamber of a gas turbine engine which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A bulkhead panel for use in a combustion chamber of a gas turbine engine, said bulkhead panel comprising:
    a first side and a second side;
    a plurality of panel holes extending from said first side to said second side through which cooling air flows;
    said first side and said second side being substantially planar from an outer edge to an inner edge;
    a circumferential rail on said first side dividing said first side into a first cavity region radially inward of said circumferential rail and a second cavity region radially outward of said first cavity region, said first cavity region containing a plurality of panel holes arrayed in a circular configuration and said second cavity region containing a plurality of said panel holes with at least one row of holes being circular and arranged concentric to said circular arrayed holes in said first cavity region; and
    said second cavity region being an unbroken space defined by an inner rail, an outer rail, two side rails, and said circumferential rail.

2. A bulkhead panel according to claim 1, wherein said first side comprises a cold side and said second side comprises a hot side exposed to combustion gases.

3. A bulkhead panel according to claim 1, wherein said panel holes in said first cavity region are arranged in a plurality of concentric rows.

4. A bulkhead panel according to claim 3, wherein said panel holes in said second cavity region are arranged in a plurality of circular rows.

5. A bulkhead panel according to claim 1, wherein each of said panel holes has an exit nozzle which has a compound angle which includes an axial component and a radial component angled at an angle in the range of pure tangential to pure radial.

6. A bulkhead panel according to claim 1, wherein each of said panel holes has an exit nozzle which is angled to create a swirling flow of cooling air.

7. A bulkhead panel according to claim 6, wherein said swirling flow of cooling air created by said panel holes flows in a clockwise direction.

8. A bulkhead panel according to claim 1, further comprising a plurality of posts on said first side for enabling said panel to be attached to a bulkhead support shell.

9. A bulkhead panel according to claim 1, further comprising a center opening for receiving a fuel injector and a fuel injector guide.

10. A bulkhead panel according to claim 9, wherein said center opening has a central lip which defines said first cavity region with said inner circumferential rail and said first cavity region comprising a sealed chamber when said central lip and said inner circumferential rail are placed in contact with a bulkhead support shell.

11. A bulkhead panel according to claim 1, further comprising integrally formed inner and outer lips on said second side.

12. A bulkhead panel according to claim 1, further comprising an outer edge, an inner edge, and a pair of radially extending side edges between said inner and outer edges.

13. A bulkhead panel according to claim 12, wherein each of said outer and inner edges is curved and each of said radially extending side walls is linear.

14. A bulkhead panel according to claim 1, wherein said circumferential rail is circular and said second cavity region borders one side of said circumferential rail and said first cavity region borders a second side of said circumferential rail.

15. A combustor for use in a gas turbine engine comprising:
    an inner support shell and an outer support shell;
    said inner support shell and said outer support shell defining a combustion chamber;
    a bulkhead assembly including a bulkhead support shell and at least one panel attached to said bulkhead support shell;
    said at least one panel having a first side and a second side, a plurality of panel holes extending from said first side to said second side through which cooling air flows, and a circumferential rail on said first side for dividing said first side into a first cavity region radially inward of said circumferential rail and a second cavity region radially outward of said first circumferential rail and radially outward of said first cavity region, said first cavity region containing a plurality of holes arranged in at least two circular rows and said second cavity region containing a plurality of panel holes with at least one row being arranged in a circular configuration; and
    said first side and said second side being substantially planar from an outer edge to an inner edge.

16. A combustor according to claim 15, further comprising:
    a liner attached to each of said inner and outer support shells;
    an annular cavity formed by said inner and outer support shells and said liners; and inner and outer lips on said at least one panel for channeling air exiting said annular cavity toward a hot surface of said liners.

17. A combustor according to claim 15, further comprising:
    said at least one panel having a central opening; and
    a fuel injector and a fuel injector guide projecting through said central opening.

18. A combustor according to claim 15, further comprising means, on said first side, for securing said at least one panel to said bulkhead support shell.

19. A combustor according to claim 15, wherein each of said panel holes has an exit nozzle which has a compound angle which includes an axial component and a radial component angled at an angle in the range of pure tangential to pure radial.

20. A combustor according to claim 15, wherein each of said panel holes has an exit nozzle configured to create a swirling flow of cooling air over said second side of said at least one panel.

21. A combustor according to claim 15, wherein said at least one panel has an outer edge, an inner edge, and a pair of radially extending side walls between said inner and outer edges.

22. A combustor according to claim 21, wherein each of said outer and inner edges is curved and each of said radially extending side walls is linear.

23. A combustor according to claim 21, wherein said second side has an outer lip and an inner lip and a surface which is substantially planar between said inner and outer lips.

24. A combustor according to claim 15, further comprising a central opening in said at least one panel, said central opening being surrounded by a central lip, said central lip forming a boundary of said first cavity region, and said first cavity region comprising a first sealed chamber when said central lip and said inner circumferential rail are placed into contact with said bulkhead support shell.

25. A combustor according to claim 24, further comprising said at least one panel having a peripheral rail forming a periphery of said second cavity region and said second cavity region comprising a second sealed chamber when said inner circumferential rail and said peripheral rail are placed into contact with said bulkhead support shell.

26. A combustor according to claim 15, further comprising a plurality of impingement holes in said bulkhead support shell and said impingement holes being arranged to impinge air on said first side of said at least one panel between adjacent ones of said panel holes and between adjacent rows of said panel holes.

27. A combustor according to claim 15, wherein said second cavity region completely surrounds said first cavity region.

28. A combustor according to claim 15, wherein said second cavity region is an unbroken area bordered by an inner rail, an outer rail, two side rails, and said circumferential rail.

* * * * *